No. 815,736. PATENTED MAR. 20, 1906.
P. C. PLASTER.
COMBINATION STEP AND EXTENSION LADDER.
APPLICATION FILED MAR. 25, 1905.
2 SHEETS—SHEET 1.
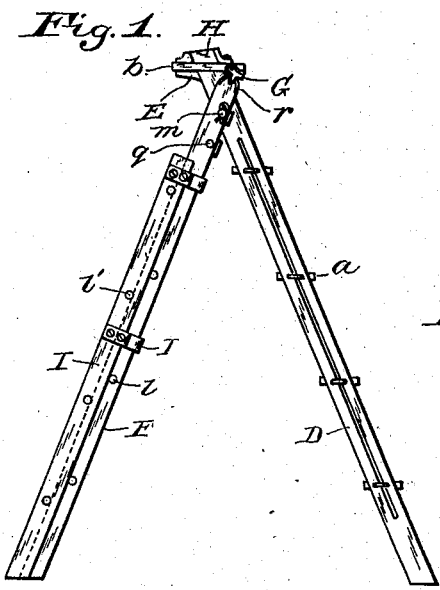
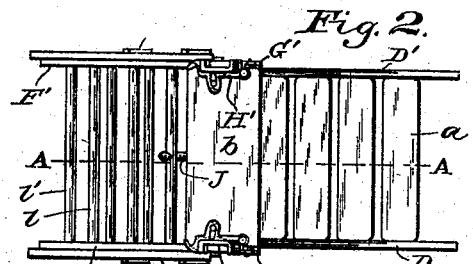
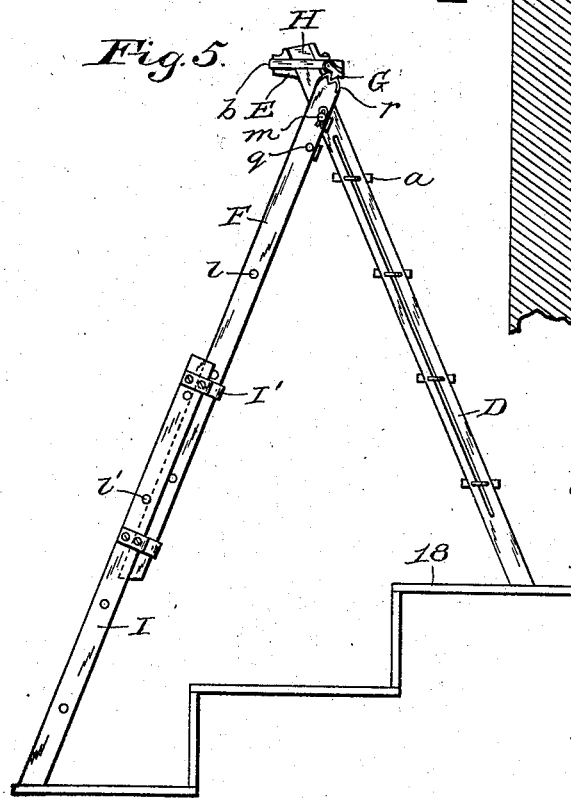
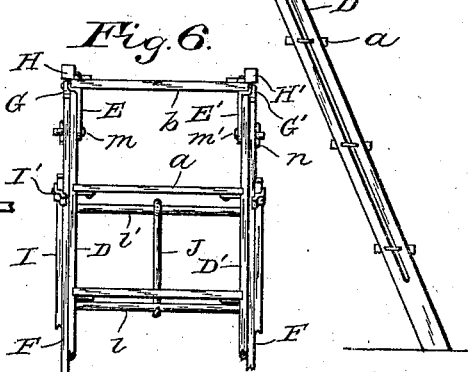
Witnesses:
E. R. Martin.
Stella Snider.
Inventor:
Purl C. Plaster,
by E. T. Silvius,
Attorney.

No. 815,736. PATENTED MAR. 20, 1906.
P. C. PLASTER.
COMBINATION STEP AND EXTENSION LADDER.
APPLICATION FILED MAR. 25, 1905.
2 SHEETS—SHEET 2.
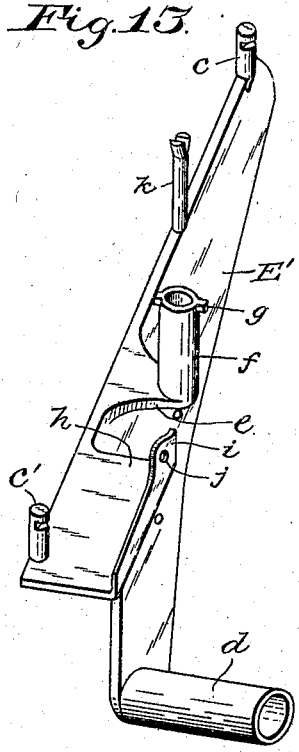
Fig. 7.
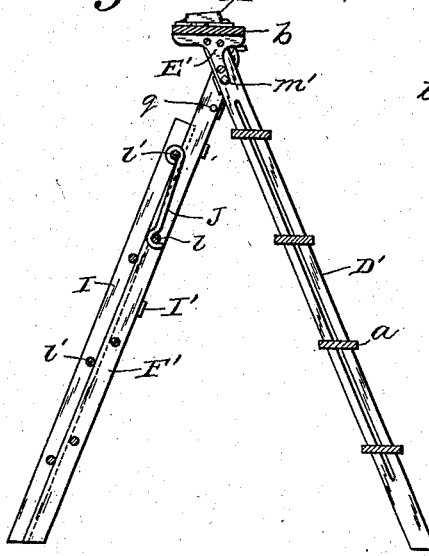
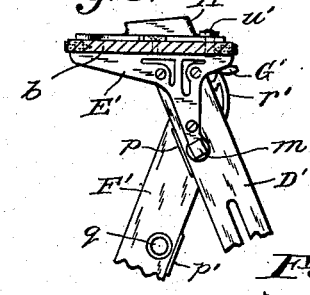
Fig. 8.
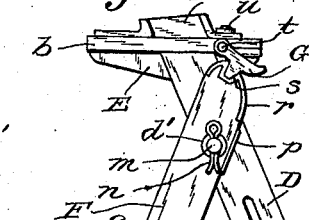
Fig. 9.
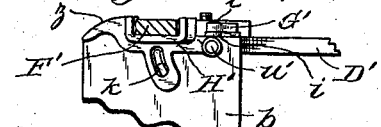
Fig. 10.
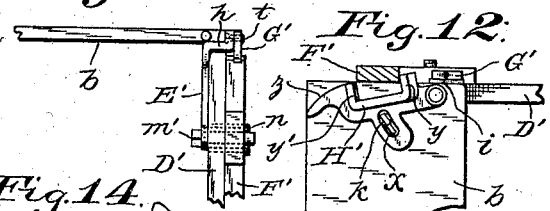
Fig. 11. Fig. 12.
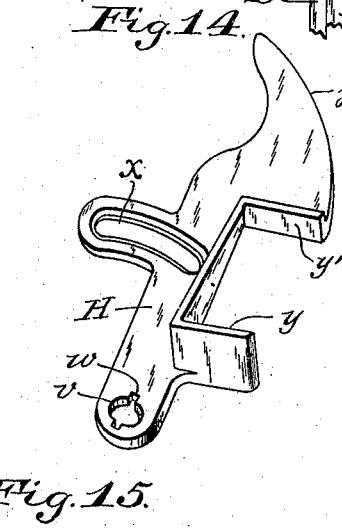
Fig. 13.
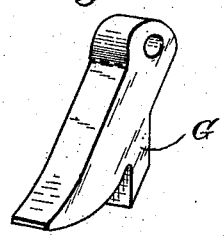
Fig. 14.
Fig. 15.
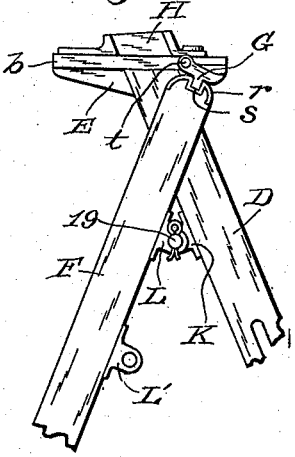
Fig. 16.
Witnesses:
E. R. Martin.
Stella Snider.
Inventor:
Purl C. Plaster,
by E. T. Silvius,
Attorney.

UNITED STATES PATENT OFFICE.

PURL C. PLASTER, OF INDIANAPOLIS, INDIANA, ASSIGNOR OF TWO-THIRDS TO JOHN MILTON MOORE, OF CROMWELL, INDIANA.

COMBINATION STEP AND EXTENSION LADDER.

No. 815,736.  Specification of Letters Patent.  Patented March 20, 1906.

Application filed March 25, 1905. Serial No. 251,934.

*To all whom it may concern:*

Be it known that I, PURL C. PLASTER, a citizen of the United States, residing at Indianapolis, in the county of Marion and State of Indiana, have invented new and useful Improvements in Combination Step and Extension Ladders; and I do declare the following to be a full, clear, and exact description of the invention, reference being had to the accompanying drawings, and to the letters of reference marked thereon, which form a part of this specification.

This invention relates to ladders that are designed to be used either as ordinary leaning ladders or as propped step-ladders, and the invention has reference particularly to the means whereby the props of the step-ladders are connected thereto and converted into extensions thereof, the invention also relating to minor features of the apparatus.

Objects of the invention are to provide improved folding step-ladders which may be readily converted into leaning or wall ladders with increased range of usefulness, to provide step-ladders that may be propped and used on stairways or the like with ease and safety, and to provide combined step and extension ladders at relatively small cost and which will be durable and economical in use.

With the above-mentioned objects in view the invention consists in a step-ladder having a ladder form of prop pivoted thereto and provided with automatic latches for securing the prop when extended as a ladder part of the step-ladder, and also provided with automatic latches for securing the prop against movements when adjusted for use as a prop to the step-ladder; and, further, the invention consists in the novel parts and the combinations and arrangements of parts, as hereinafter particularly described and claimed.

Referring to the drawings, Figure 1 is a side elevation of the invention having an extensible ladder-prop and set up as a propped step-ladder; Fig. 2, a top plan thereof; Fig. 3, a side elevation of the invention set up as a wall or leaning ladder without the extensible part of the ladder-prop; Fig. 4, a fragmentary top plan of the step-ladder, as shown in Fig. 2; Fig. 5, a side elevation of the invention including the extensible ladder-prop as arranged on a stairway. Fig. 6, a fragmentary front elevation of the ladder; Fig. 7, a vertical sectional view of the ladder on the line A A in Fig. 2; Fig. 8, a fragmentary sectional view on the line B B in Fig 4; Fig. 9, a fragmentary side elevation reproducing the upper portions of Figs. 1 and 5; Fig. 10, a fragmentary horizontal sectional view on the line C C in Fig. 3; Fig. 11, a fragmentary rear elevation of the ladder arranged as in Figs. 1 or 5; Fig. 12, a fragmentary sectional view on the line C C in Fig. 3, with the difference that the latch for the ladder-prop is open ready for folding the prop from its extended position to a position opposite the step-ladder part; Fig. 13, a perspective view of one of the main supports; Fig. 14, a perspective view of one of the extension-ladder latches; Fig. 15, a perspective view of one of the prop-latches, and Fig. 16 a fragmentary side elevation showing a modified form of pivot for the ladder-prop.

Similar reference characters in the drawings designate corresponding parts or features.

In construction the step-ladder part of the apparatus comprises a pair of side pieces D and D', to which are secured a suitable number of flat steps $a$ and a platform $b$ somewhat broader than the steps, the platform being on the tops of the side pieces. A pair of main supports E and E' are secured against the inner sides of the upper portions of the side pieces and extend to the under side of the platform and partially support it, and the supports have studs $c$ and $c'$ for connecting the platform thereto in a well-known manner. The lower portions of the supports have each an integral thimble $d$, that extends through the adjacent side piece D or D', and the upper portions of the supports are each provided with a bracket $e$, to which is attached a pivot $f$, that extends up through the platform $b$, the top of the pivot having lugs $g$ attached to the outer sides thereof. A horizontal flange $h$ of the support extends to an end of the platform $b$ and is provided with an ear $i$, that stands vertically against the end of the platform and is provided with a pivot-hole $j$. Each support is also provided with a stud $k$, that is attached to the top thereof at a suitable distance from the pivot $f$ and extends through the platform $b$.

The ladder-prop part of the apparatus comprises a pair of side pieces F and F', to which are attached a suitable number of rounds $l$, the side bars being connected to the side bars D and D′ by removable pivot-pins m and m′, which extend through the thimbles d and through bushes d′, that are inserted in holes in the side pieces F F′. The pivot-pins are retained by cotters n, inserted in their ends. The pivotal points are arranged at some distance from the upper ends of the side bars and also near the rear edges of the side bars D D′ and near the forward edges of the side bars F F′. Additional bushed pivot-holes q are provided in the side bars F F′, and the side bars are reinforced near the pivot-holes by plates p and p′, attached to the edges thereof. The tops of the side pieces F F′ are provided with latch-pieces r and r′, having each a notch s in the top thereof. Latches G and G′ are connected to the ears i by pivots t, secured in the holes j of the ears, the latches being adapted to fall by gravity into the notches s of the latch-pieces when the ladder-prop is arranged as a prop for the step-ladder part in order to hold the prop in the desired position relative to the other part of the step-ladder. When the prop-latches are disengaged from the prop, the latter may be moved on its pivots so as to swing upwardly and form an extended leaning ladder in connection with the step part, as in Fig. 3.

The devices for holding the step part and the prop part in their proper relative positions to form together a leaning or wall ladder comprise a pair of latches H and H′, that have suitable pivots u and u′ on the top of the platform b, near the front and ends thereof, the pivots corresponding to the pivots f. The latches have pivot-holes v to receive the pivots and recesses w at the sides of the holes to permit the passage of the lugs g when assembling the parts, the lugs being designed to retain the latches on the pivots. Each stud k extends through a curved slot x in each latch and has its top split, so as to prevent the latch from rising from the platform b. Each latch has two opposing abutments y and y′, that are adapted to engage opposite sides of a side piece F or F′, and the free or swinging end of each latch has a long curved guide edge z, extending from the outer end of the abutment y′ and adapted to be engaged by the side piece for pushing open the latch in case it should not be open to receive the side piece when moving it upwardly to form the ladder extension.

In order to provide an extensible prop when the apparatus is used as a step-ladder on stairs or similarly, a ladder-section I, having rounds l′, is connected movably to the side pieces F and F′ by means of guides I′, and a hook J is connected to a round l′ of section I and detachably to a round l of the ladder-prop for adjusting the position of the section I.

In some cases the step part and the prop part are pivotally connected together by means of pivot-blocks K, attached to the side pieces of the step part, pivot-blocks L, attached to the side pieces of the ladder-prop part, and pivot-pins 19, additional pivot-blocks L′ being provided for use in reducing the length of the ladder-prop part.

In practical use the ladder-section I may be hooked up, as in Figs. 1 and 7, and the prop part and the step part may be folded with their lower ends close together conveniently for carrying about. When so folded, the latches G and G′ will hang downwardly, and in order to adjust the apparatus as a step-ladder the lower end of the prop part is to be drawn away from the step part until the latches G G′ drop into the notches s at the tops of the side pieces thereof. If, then, it be desired to lengthen the prop part, the section I may be moved so as to extend beyond the end of the prop part proper, as in Fig. 5, when the step part may be placed upon a stairway or a window-sill or in similar arrangements. The section I may be readily detached from the prop part proper when not needed for use. In order to convert the apparatus into a leaning or wall ladder, the latches G and G′ should be withdrawn from the notches, and then the prop part should be moved about its pivots until the lower end moves up to a point in line with the step part, as in Fig. 3, the side pieces becoming engaged automatically by the latches H and H′, and thereby securely held.

The ladder may be shortened by changing the pivot-pins m m′ to the holes q in the side pieces. In order to again fold the apparatus, the latches H H′ may be moved, as indicated in Fig. 12, when the ladder part will be released.

Having described the invention, what I claim as new is—

1. A step and extension ladder including a step part provided at the top thereof with a pair of oppositely-disposed guided latches movable transversely thereto, a ladder-prop pivoted to the step part and swinging within range of the pair of latches to be latched thereby to the step part to form a continuous ladder in connection therewith.

2. A step and extension ladder including a step part provided at the top thereof with a pair of oppositely-disposed guided latches either movable toward the other and each provided with an abutment having an inclined guide extending from the outer end thereof, a ladder-prop pivoted to the step part and swinging within range of the pair of latches so as to engage the inclined guides thereof and to be latched by the abutments of the latches to form a continuous ladder in connection with the step part.

3. A step and extension ladder comprising a step part provided at the top thereof with a pair of oppositely-disposed pivoted latches movable in a horizontal plane, a ladder-prop pivoted to the step part and swinging within range of the pair of latches to be latched thereby to the step part to form a continuous ladder in connection therewith.

4. A step and extension ladder comprising a step part provided at the top thereof with a pair of movable latches having each a pair of opposing abutments, one abutment of each pair provided with an inclined guide extending from the outer end thereof, a ladder-prop pivoted to the step part and having side pieces each fitting between a pair of the abutments of the latches.

5. A step and extension ladder comprising a step part having side pieces and a top platform, supports attached to the side pieces and the platform of the step part and supporting pivots and studs extending through the platform, latches movable on the platform and connected pivotally to the pivots and guided by the studs of the supports and having each a pair of opposing abutments, a ladder-prop having side pieces pivoted to the side pieces of the step part and each fitting between a pair of abutments of the latches.

6. A step and extension ladder comprising a step part having side pieces, supports attached to the side pieces of the step part, a ladder-prop having side pieces pivoted to the side pieces of the step part and having notches in the upper ends thereof, and prop-latches supported by the supports for engaging the side pieces of the prop part in the notches thereof.

7. A step and extension ladder comprising a step part having side pieces and a platform, supports attached to the side pieces and the platform of the step part and provided with pivoting-thimbles extending through the side pieces, a ladder-prop part, and pivot-pins extending through the pivoting-thimbles of the supports and also through parts of the prop part.

8. A step and extension ladder comprising a step part having side pieces and a platform, a pair of oppositely-disposed guided latches mounted on the platform and movable one toward the other one, a ladder-prop pivoted to the step part and swinging within range of the pair of latches to be latched thereby to the step part to form a continuous ladder in connection with the step part, and an extension-section connected adjustably to the ladder-prop.

9. A step and extension ladder comprising a step part provided at the top thereof with a pair of oppositely-disposed guided latches movable oppositely one to the other, a ladder-prop pivoted to the step part capable of swinging within range of the pair of latches to be latched thereby to the step part to form a continuous ladder in connection therewith, and a pair of gravity prop-latches coöperating with the tops of the step part and the ladder-prop to prevent the swinging of the ladder-prop.

In testimony whereof I affix my signature in presence of two witnesses.

PURL C. PLASTER.

Witnesses:
WM. H. PAYNE,
E. T. SILVIUS.